US012113299B2

(12) United States Patent
Chien et al.

(10) Patent No.: US 12,113,299 B2
(45) Date of Patent: Oct. 8, 2024

(54) SIGNAL RADIATION DEVICE AND ANTENNA STRUCTURE

(71) Applicant: HTC Corporation, Taoyuan (TW)

(72) Inventors: Chia-Te Chien, Taoyuan (TW); Cheng-Hung Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 209 days.

(21) Appl. No.: 17/696,874

(22) Filed: Mar. 17, 2022

(65) Prior Publication Data

US 2023/0087415 A1 Mar. 23, 2023

Related U.S. Application Data

(60) Provisional application No. 63/245,207, filed on Sep. 17, 2021.

(51) Int. Cl.
*H01Q 19/185* (2006.01)
*H01Q 5/307* (2015.01)
(Continued)

(52) U.S. Cl.
CPC ........... *H01Q 5/307* (2015.01); *H01Q 19/106* (2013.01); *H01Q 19/185* (2013.01); *H01Q 21/30* (2013.01); *H01Q 25/00* (2013.01)

(58) Field of Classification Search
CPC ......... H01Q 5/307; H01Q 21/29; H01Q 21/30
See application file for complete search history.

(56) References Cited

U.S. PATENT DOCUMENTS 10,431,881 B2 * 10/2019 Wu ........................ H01Q 15/18
2011/0063187 A1 * 3/2011 Huang ..................... H01Q 1/38
343/893
(Continued)

FOREIGN PATENT DOCUMENTS

CN 102142620 B * 9/2013 ........... H01Q 21/205
JP 2001244731 9/2001
(Continued)

OTHER PUBLICATIONS

"Waveguide." Merriam-Webster.com Dictionary, Merriam-Webster, https://www.merriam-webster.com/dictionary/waveguide. Accessed Apr. 22, 2024. (Year: 2024).*
(Continued)

*Primary Examiner* — Dameon E Levi
*Assistant Examiner* — Leah Rosenberg
(74) *Attorney, Agent, or Firm* — JCIPRNET

(57) ABSTRACT

A signal radiation device and an antenna structure are provided. The signal radiation device includes a first signal radiator, a second signal radiator, and a reflective signal radiator. The first signal radiator is configured to perform a transceiving operation on a first signal along a first direction. The second signal radiator is disposed by overlapping with the first signal radiator, and is configured to perform the transceiving operation on at least one second signal along a second direction and/or a third direction. The first direction, the second direction, and the third direction are different. The reflective signal radiator is disposed between the first signal radiator and the second signal radiator, and is configured to perform the transceiving operation on a third signal omnidirectionally. A frequency band of the third signal is lower than a frequency band of the first signal and a frequency band of the second signal.

19 Claims, 8 Drawing Sheets

100

(51) Int. Cl.

| | |
|---|---|
| ***H01Q 19/10*** | (2006.01) |
| ***H01Q 21/30*** | (2006.01) |
| ***H01Q 25/00*** | (2006.01) |

(56) References Cited

U.S. PATENT DOCUMENTS

| | | | | |
|---|---|---|---|---|
| 2011/0274146 | A1* | 11/2011 | Huang | H01Q 1/38<br>343/837 |
| 2015/0380805 | A1 | 12/2015 | Arranz | |
| 2017/0170550 | A1* | 6/2017 | Moon | H01Q 1/36 |
| 2019/0198995 | A1* | 6/2019 | Ryoo | H01Q 1/243 |
| 2020/0006858 | A1* | 1/2020 | Wu | H01Q 21/28 |
| 2020/0235495 | A1* | 7/2020 | Yang | H01Q 1/241 |

FOREIGN PATENT DOCUMENTS

| | | |
|---|---|---|
| JP | 2010119002 | 5/2010 |
| JP | 2019118095 | 7/2019 |
| KR | 1020050075966 | 7/2005 |
| TW | 201739104 | 11/2017 |

OTHER PUBLICATIONS

"Office Action of Japan Counterpart Application", issued on Jun. 13, 2023, p. 1-p. 3.
"Office Action of Taiwan Counterpart Application", issued on Feb. 17, 2023, p. 1-p. 7.
"Office Action of Korea Counterpart Application", issued on May 10, 2024, with English translation thereof, p. 1-p. 9.

* cited by examiner

SIGNAL RADIATION DEVICE AND ANTENNA STRUCTURE

CROSS-REFERENCE TO RELATED APPLICATION

This application claims the priority benefit of U.S. provisional application Ser. No. 63/245,207, filed on Sep. 17, 2021. The entirety of the above-mentioned patent application is hereby incorporated by reference herein and made a part of this specification.

BACKGROUND

Technical Field

The disclosure relates to a signal radiation device and an antenna structure, and more particularly, to a signal radiation device and an antenna structure that may achieve frequency division and multiplexing.

Description of Related Art

With the advancement of electronic technology and the advent of the information age, wireless communication has become an essential capability of electronic devices.

In order to increase the communication bandwidth of the electronic devices, the application of frequency division and multiplexing has become an inevitable trend. In the current technical field, antenna devices are often designed with antennas having linearly polarized waves, which are mainly of a broadside pattern and an endfire pattern, and are not designed with circularly polarized waves.

SUMMARY

The disclosure provides a signal radiation device and an antenna structure, which may provide a transceiving operation on multiple radio frequency signals and achieve an application of frequency division and multiplexing.

A signal radiation device in the disclosure includes a first signal radiator, a second signal radiator, and a reflective signal radiator. The first signal radiator is configured to perform a transceiving operation on a first signal along a first direction. The second signal radiator is disposed by overlapping with the first signal radiator, and is configured to perform the transceiving operation on at least one second signal along a second direction and/or a third direction. The first direction, the second direction, and the third direction are different. The reflective signal radiator is disposed between the first signal radiator and the second signal radiator, and is configured to perform the transceiving operation on a third signal omnidirectionally. A frequency band of the third signal is lower than a frequency band of the first signal and a frequency band of the second signal.

An antenna structure in the disclosure includes multiple signal radiation devices as described above. The signal radiation devices are coupled to one another.

Based on the above, the signal radiation device in the disclosure has the signal radiators that perform the transceiving operation on the signals of different directions and the reflective signal radiator that may perform the transceiving operation on the signals omnidirectionally. The antenna device may achieve multi-frequency operation, and provide the radio frequency signals to achieve the function of frequency division and multiplexing.

DETAILED DESCRIPTION OF DISCLOSED EMBODIMENTS

Figure 1:
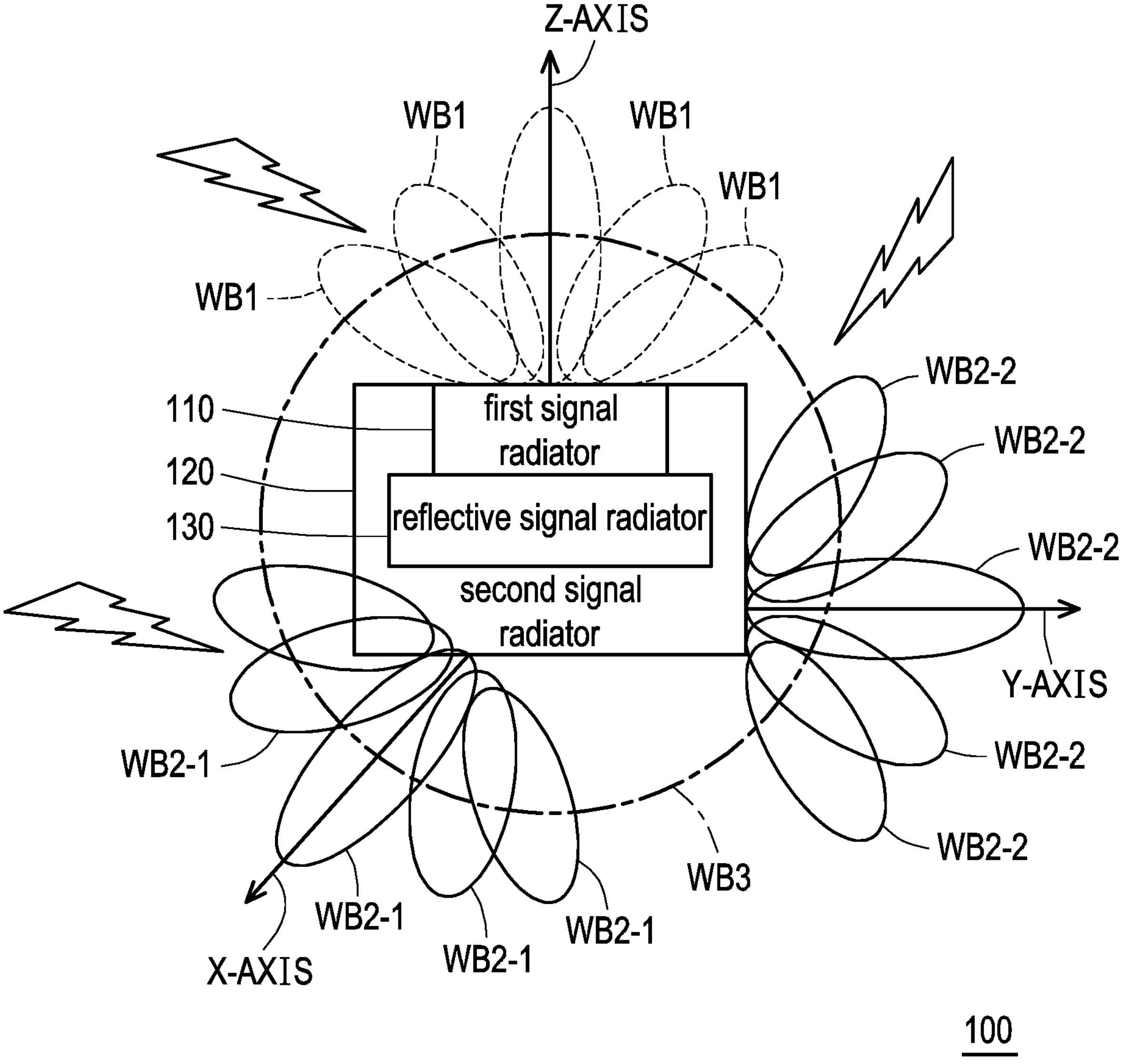
FIG. 1 is a schematic view of a signal radiation device according to an embodiment of the disclosure.

Referring to FIG. 1, FIG. 1 is a schematic view of a signal radiation device according to an embodiment of the disclosure. A signal radiation device 100 includes a first signal radiator 110, a second signal radiator 120, and a reflective signal radiator 130. The first signal radiator 110 is configured to perform a transceiving operation on a first signal WB1 along a first direction. In this embodiment, the first direction may be a direction of a first axis Z-AXIS. The second signal radiator 120 is disposed by overlapping with the first signal radiator 110. The second signal radiator 120 is configured to perform the transceiving operation on second signals WB2-1 and WB2-2 along a second direction X-AXIS and/or a third direction Y-AXIS. In this embodiment, the second direction may be a direction of a second axis X-AXIS, and the third direction may be a direction of a third axis Y-AXIS. The first axis Z-AXIS, the second axis X-AXIS, and the third axis Y-AXIS are different. In this embodiment, every two of the first axis Z-AXIS, the second axis X-AXIS, and the third axis Y-AXIS may be orthogonal to each other.

In addition, the reflective signal radiator 130 is disposed between the first signal radiator 110 and the second signal radiator 120. The reflective signal radiator 130 is configured to perform the transceiving operation on a third signal WB3 omnidirectionally.

In this embodiment, the third signal WB3 is a signal of a second frequency band. The first signal WB1 includes at least one of a signal of a first frequency band and a signal of a third frequency band. The second signals WB2-1 and WB2-2 include at least one of the signal of the first frequency band and the signal of the third frequency band, and the second frequency band is lower than the first frequency band and the third frequency band. In addition, the first frequency band and the third frequency band may be the same or different.

Through a combination of the first signal radiator 110, the second signal radiator 120, and the reflective signal radiator 130, the signal radiation device 100 in this embodiment may have the capability of operating in multiple frequency bands, and may provide the transceiving operation on multiple radio frequency signals, so as to achieve an application of frequency division and multiplexing.

The signal radiation device 100 in this embodiment of the disclosure may also provide a signal radiation device similar to omnidirectional pattern modulation. The signal radiation device 100 has a coverage of circularly polarized waves, enhances propagation of any polarized waves in space, and may achieve an effect of polarization diversity.

Figure 2:
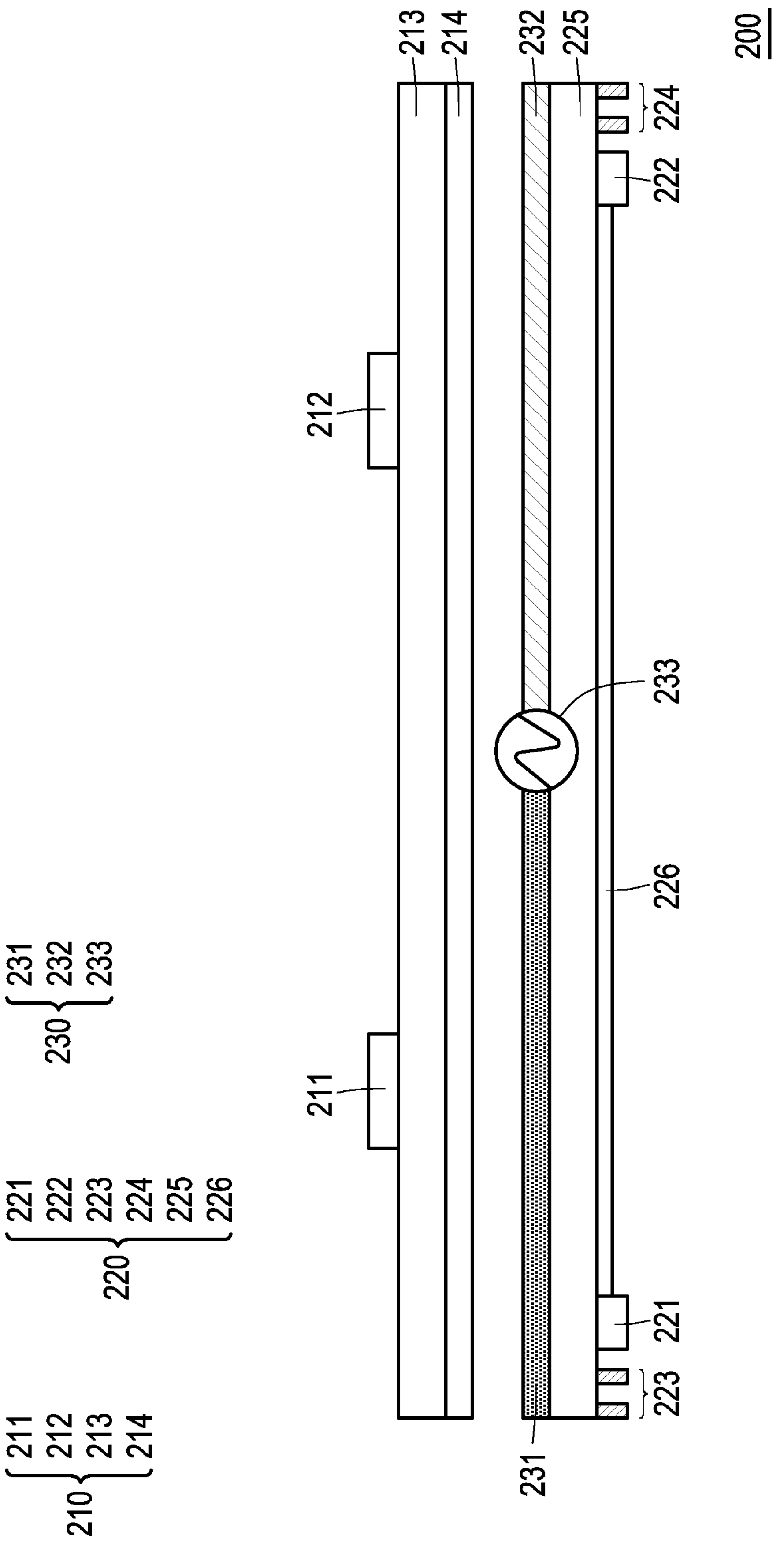
FIG. 2 is a side view of a signal radiation device according to an embodiment of the disclosure.

Hereinafter, referring to FIG. 2, FIG. 2 is a side view of a signal radiation device according to an embodiment of the disclosure. A signal radiation device 200 includes a first signal radiator 210, a second signal radiator 220, and a reflective signal radiator 230. The first signal radiator 210 includes a reflection plate 214, a substrate 213, and radiation bodies 211 and 212. The substrate 213 is disposed on the reflection plate 214, and the radiation bodies 211 and 212 are disposed on the substrate 213. The reflection plate 214 may be a signal reflector facing the first axis (e.g., a Z axis of a three-dimensional coordinate system), and is configured to provide a reference ground plane of the first signal radiator 210. The radiation bodies 211 and 212 may be metal plates configured to radiate the radio frequency signals, and are configured to enable the signals to be radiated toward a direction of the Z axis. It should be noted that the number of the radiation bodies 211 and 212 may be one or more, and there is no specific limitation.

The second signal radiator 220 includes radiation bodies 221 and 222, director elements 223 and 224, a substrate 225, and a reflection plate 226. The substrate 225 is disposed by overlapping with the reflection plate 214, and is disposed below the reflection plate 214. The reflection plate 226 is disposed below the substrate 225. The radiation bodies 221 and 222 are respectively disposed on two sides of the reflection plate 226, that is, two sides of the signal radiation device 200. The director element 223 is disposed on an outer side of the radiation body 221, and the director element 224 is disposed on an outer side of the radiation body 222.

The reflection plate 226 may be a vertical reflector. The radiation bodies 221 and 222 are Quasi-Yagi radiation bodies, and may be equivalent to a dipole radiation body. The second signal radiator 220 may have a horizontal reflector equivalent to the Quasi-Yagi radiation body on either side of the signal radiation device 200, so that a direction of beam thereof may radiate toward a side of the substrate 225.

In this embodiment, the director element 223 may have one or more director units, and there is no specific limitation. The director element 224 may also have one or more director units, and there is no specific limitation.

In this embodiment, the reflection plate 226 may be a signal reflector facing the second axis (e.g., an X axis of the three-dimensional coordinate system) or the third axis (e.g., a Y axis of the three-dimensional coordinate system). The reflection plate 226 may provide a reference ground plane of the second signal radiator 220. The radiation bodies 221 and 222 may be metal plates configured to radiate the radio frequency signals.

In addition, the reflective signal radiator 230 includes reflection plates 231 and 232 and a signal feed source 233. The signal feed source 233 is coupled between the reflection plates 231 and 232 to form a radiator group. The radiator group formed by the reflection plates 231 and 232, and the signal feed source 233 is disposed between the reflection plate 214 and the substrate 225. The signal feed source 233 transmits the radio frequency signals to the reflection plates 231 and 232. The reflection plate 231 and the reflection plate 232 are respectively configured to transceive signals of opposite polarities.

In this embodiment, the reflection plates 231 and 232 should be able to provide a reflection operation on the signals along the X, Y, and Z axes. Metal surfaces of the reflection plates 231 and 232 may be equivalent to the dipole radiation body, and beams thereof are similar to an omnidirectional radiation pattern, so that the reflective signal radiator 230 may perform the transceiving operation on the signals omnidirectionally.

Figure 3:
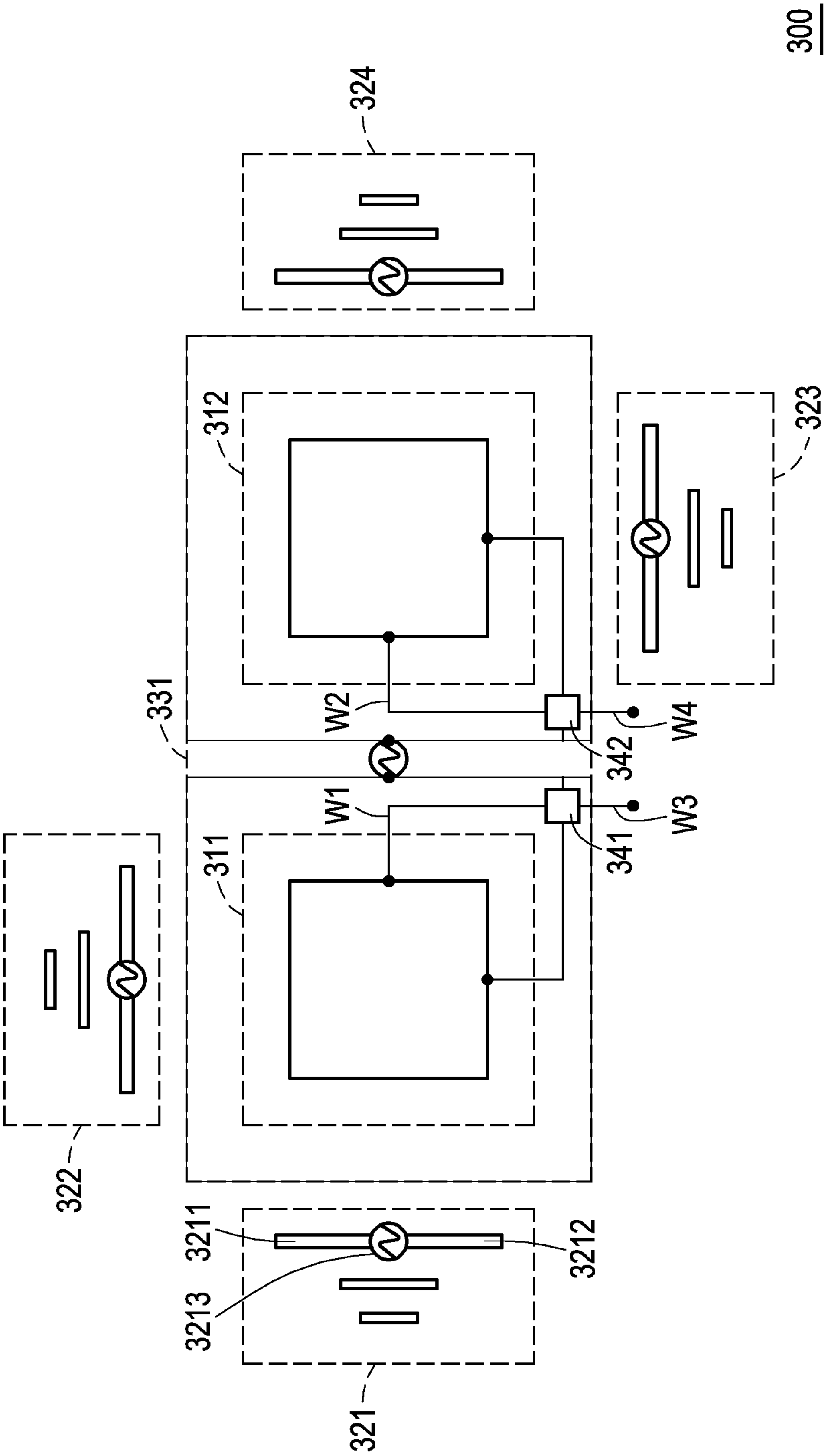
FIG. 3 is a top view of a signal radiation device according to an embodiment of the disclosure.

Hereinafter, referring to FIG. 3, is a top view of a signal radiation device according to an embodiment of the disclosure. A signal radiation device 300 includes first signal radiators 311 and 312, second signal radiators 321 to 324, and a reflective signal radiator 331. The first signal radiators 311 and 312 are disposed in pairs. The second signal radiators 321 and 322 are disposed on two sides of the first signal radiator 311, and the second signal radiators 323 and 324 are disposed on two sides of the first signal radiator 312. The first signal radiators 311 and 312 may perform the transceiving operation on the signals along the Z axis. The second signal radiators 321 and 324 may provide the transceiving operation on the signals along the X axis, and the second signal radiators 322 and 323 provide the transceiving operation on the signals along the Y axis.

In addition, the reflective signal radiator 331 is disposed below the first signal radiators 311 and 312.

In this embodiment, taking the second signal radiator 321 as an example, a radiation body in the second signal radiator 321 may be constructed by sub-radiation bodies 3211 and 3212. The second signal radiator 321 further includes a signal feed source 3213. The signal feed source 3213 is coupled between the sub-radiation body 3211 and the sub-radiation body 3212, and transmits the radio frequency signals to the sub-radiation bodies 3211 and 3212.

Incidentally, in this embodiment, the signal radiation device 300 also includes a feeder circuit formed by multiple transmission wires W1 to W4. The feeder circuit is configured to transmit an electrical signal in the signal radiation device 300. In addition, the signal radiation device 300 also includes radiation switches 341 and 342, which are configured to match with the feeder circuit to control a transmission operation on the electrical signal.

It is worth mentioning that in this embodiment of the disclosure, the numbers of the first signal radiators and the second signal radiators included in the signal radiation device are not particularly limited. The numbers of the first signal radiators and the second signal radiators shown in the embodiment of FIG. 3 are only examples for illustration, and are not intended to limit the scope of the disclosure.

Figure 4A:
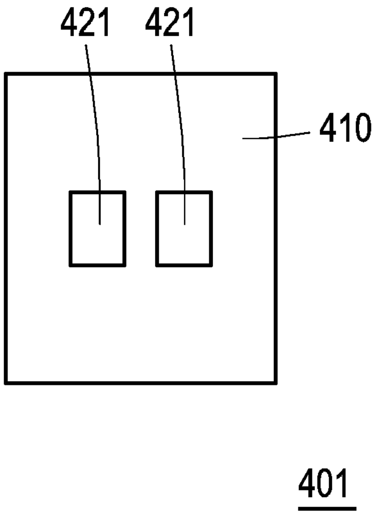
FIGS. 4A to 4D are schematic views of different implementations of a first signal radiator according to the embodiment of the disclosure, respectively.

Hereinafter, referring to FIGS. 4A to 4D, FIGS. 4A to 4D are schematic views of different implementations of a first signal radiator according to the embodiment of the disclosure, respectively. In FIG. 4A, a first signal radiator 401 includes a reflection plate (not shown), a substrate 410, and multiple radiation bodies 421. The radiation bodies 421 may be rectangular in shape, and are disposed on the substrate 410. The reflection plate is disposed under the substrate 410 and covered by the substrate 410.

Figure 4B:
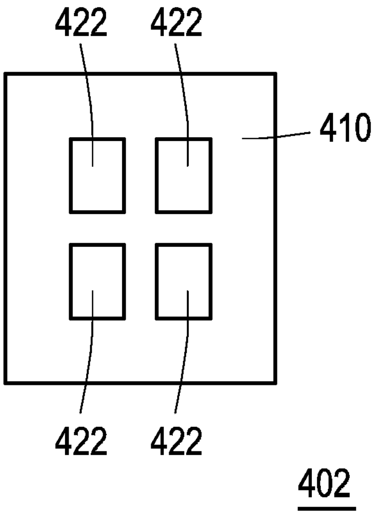

In FIG. 4B, a first signal radiator 402 includes the reflection plate (not shown), the substrate 410, and multiple radiation bodies 422. The radiation bodies 422 may be rectangular in shape, and are disposed on the substrate 410 in an array fashion. The reflection plate is disposed under the substrate 410 and covered by the substrate 410.

Figure 4C:
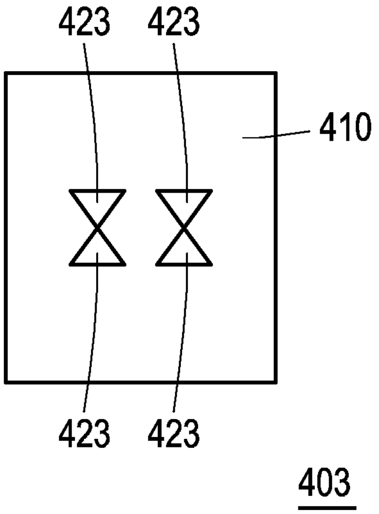

In FIG. 4C, a first signal radiator 403 includes the reflection plate (not shown), the substrate 410, and multiple radiation bodies 423. The radiation bodies 423 may be triangular in shape, and are disposed on the substrate 410 in an array fashion. The reflection plate is also disposed under the substrate 410 and covered by the substrate 410.

Figure 4D:
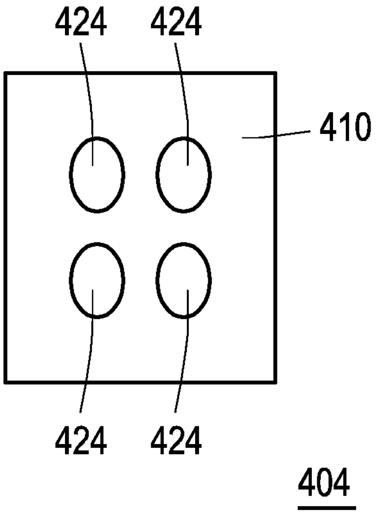

In FIG. 4D, a first signal radiator 404 includes the reflection plate (not shown), the substrate 410, and multiple radiation bodies 424. The radiation bodies 424 may be circular (or elliptical) in shape, and are disposed on the substrate 410 in an array fashion. The reflection plate is also disposed under the substrate 410 and covered by the substrate 410.

Figure 5C:
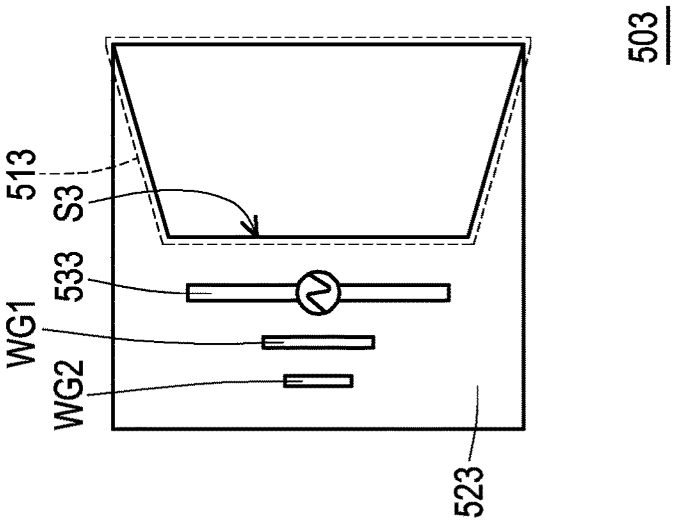
FIGS. 5A to 5C are schematic views of different implementations of a second signal radiator according to the embodiment of the disclosure, respectively.
Figure 5B:
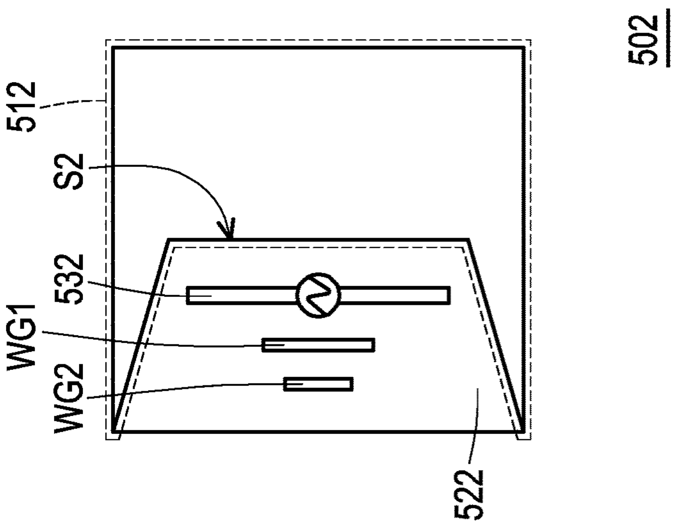
Figure 5A:
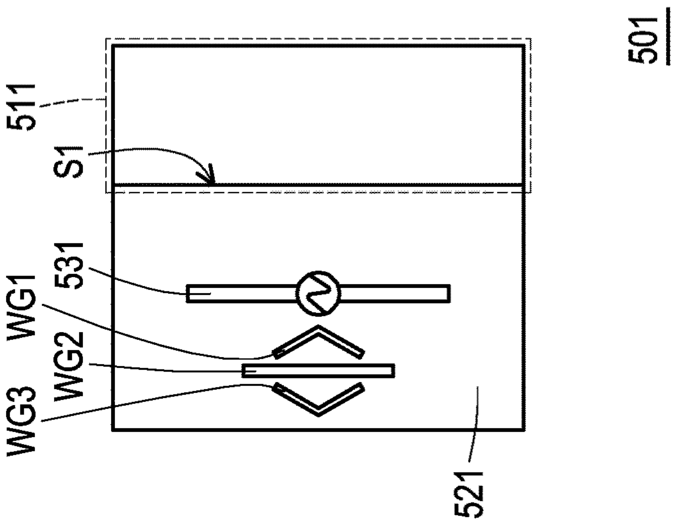

Hereinafter, referring to FIGS. 5A to 5C, FIGS. 5A to 5C are schematic views of different implementations of a second signal radiator according to the embodiment of the disclosure, respectively. In FIG. 5A, a second signal radiator 501 includes a reflection plate 511, a substrate 521, a radiation body 531, and director elements WG1 to WG3. The substrate 521 is disposed on the reflection plate 511, and the radiation body 531 and the director elements WG1 to WG3 are disposed outside a side S1 of the reflection plate 511. In this embodiment, the side S1 of the reflection plate 511 adjacent to the radiation body 531 may be a flat side. It is worth noting that shapes of the director elements WG1 to WG3 may be different. The shape of the director element WG1 may be a shape of >. The shape of the director element WG2 may be a long strip. The shape of the director element WG3 may be a shape of <.

In FIG. 5B, a second signal radiator 502 includes a reflection plate 512, a substrate 522, a radiation body 532, and the director elements WG1 and WG2. The substrate 522 is disposed on the reflection plate 512, and the radiation body 532 and the director elements WG1 and WG2 are disposed outside a side S2 of the reflection plate 512. In this embodiment, the side S2 of the reflection plate 512 adjacent to the radiation body 532 has a concave portion. The concave portion of the reflection plate 512 may enable wireless signals transceived by the radiation body 532 to have a function of aggregation. An included angle of the concave portion may be set according to a wavelength of a transceiving signal.

In FIG. 5C, a second signal radiator 503 includes a reflection plate 513, a substrate 523, a radiation body 533, and the director elements WG1 and WG2. The substrate 523 is disposed on the reflection plate 513, and the radiation body 533 and the director elements WG1 and WG2 are disposed outside a side S3 of the reflection plate 513. In this embodiment, the side S3 of the reflection plate 513 adjacent to the radiation body 533 has a protruding portion. The protruding portion of the reflection plate 513 may enable the wireless signals transceived by the radiation body 533 to have a function of divergence.

Figure 6:
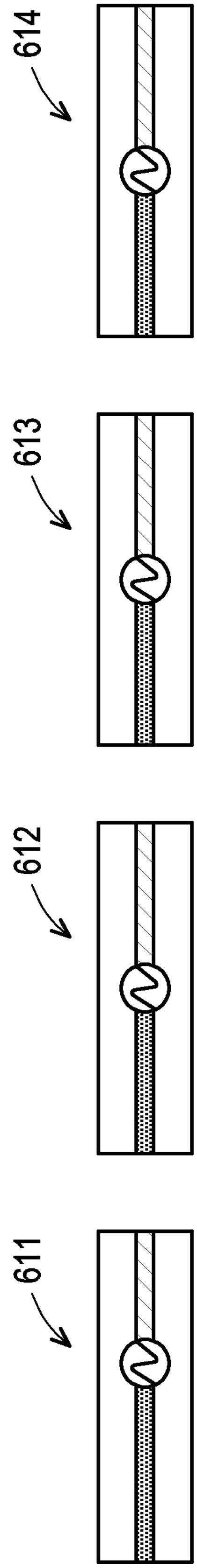
FIG. 6 is a schematic view of different implementations of a reflective signal radiator according to the embodiment of the disclosure.

Hereinafter, referring to FIG. 6, FIG. 6 is a schematic view of different implementations of a reflective signal radiator according to the embodiment of the disclosure. Compared with the reflective signal radiator 230 in FIG. 2, a reflective signal radiator 600 in this embodiment includes multiple radiator groups 611 to 614. The radiator groups 611 to 614 may have the same architecture as one another, and each of the radiator groups 611 to 614 may have the same architecture as the reflective signal radiator 230. The radiator groups 611 to 614 are disposed in sequence horizontally, and there may be a spacing distance between two of the radiator groups 611 to 614 that are directly adjacent.

Figure 7:
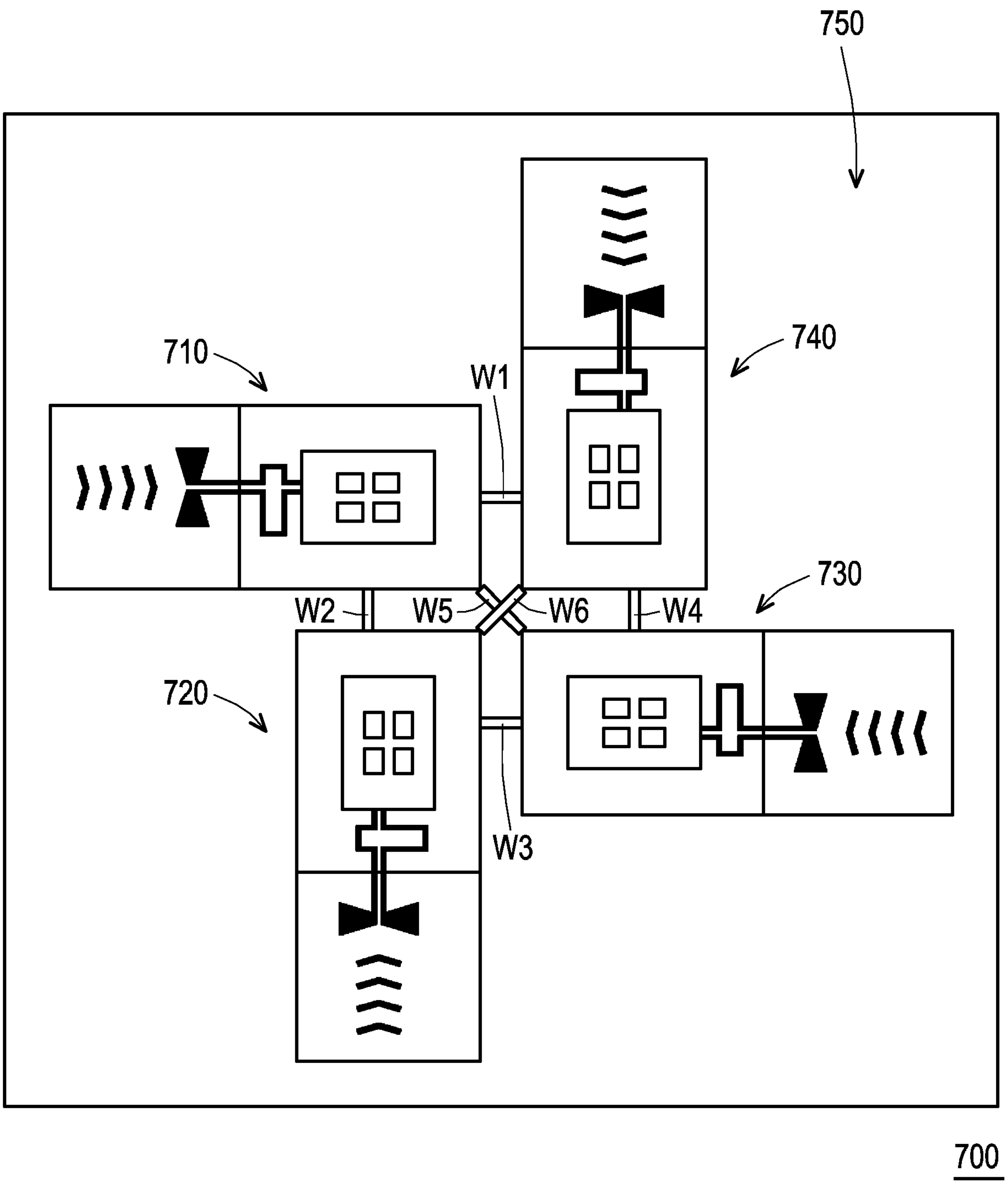
FIG. 7 is a schematic view of an antenna structure according to an embodiment of the disclosure.

Referring to FIG. 7, FIG. 7 is a schematic view of an antenna structure according to an embodiment of the disclosure. An antenna structure 700 includes multiple signal radiation devices 710 to 740, a planar substrate 750, and multiple transmission wires W1 to W6. The signal radiation devices 710 to 740 are collectively disposed on the planar substrate 750, and the planar substrate 750 may be a multilayer substrate. Every two of the signal radiation devices 710 to 740 are electrically connected to each other through the transmission wires W1 to W6. In detail, the signal radiation devices 710 and 720 are electrically connected to each other through the transmission wire W2; the signal radiation devices 720 and 730 are electrically connected to each other through the transmission wire W3; the signal radiation devices 730 and 740 are electrically connected to each other through the transmission wire W4; the signal radiation devices 710 and 740 are electrically connected to each other through the transmission wire W1; the signal radiation devices 710 and 730 are electrically connected to each other through the transmission wire W5, and the signal radiation devices 720 and 740 are electrically connected to each other through the transmission wire W6.

Implementation details of each of the signal radiation devices 710 to 740 have been described in detail in the foregoing embodiments and implementations, and thus the same details will not be repeated in the following.

Figure 8:
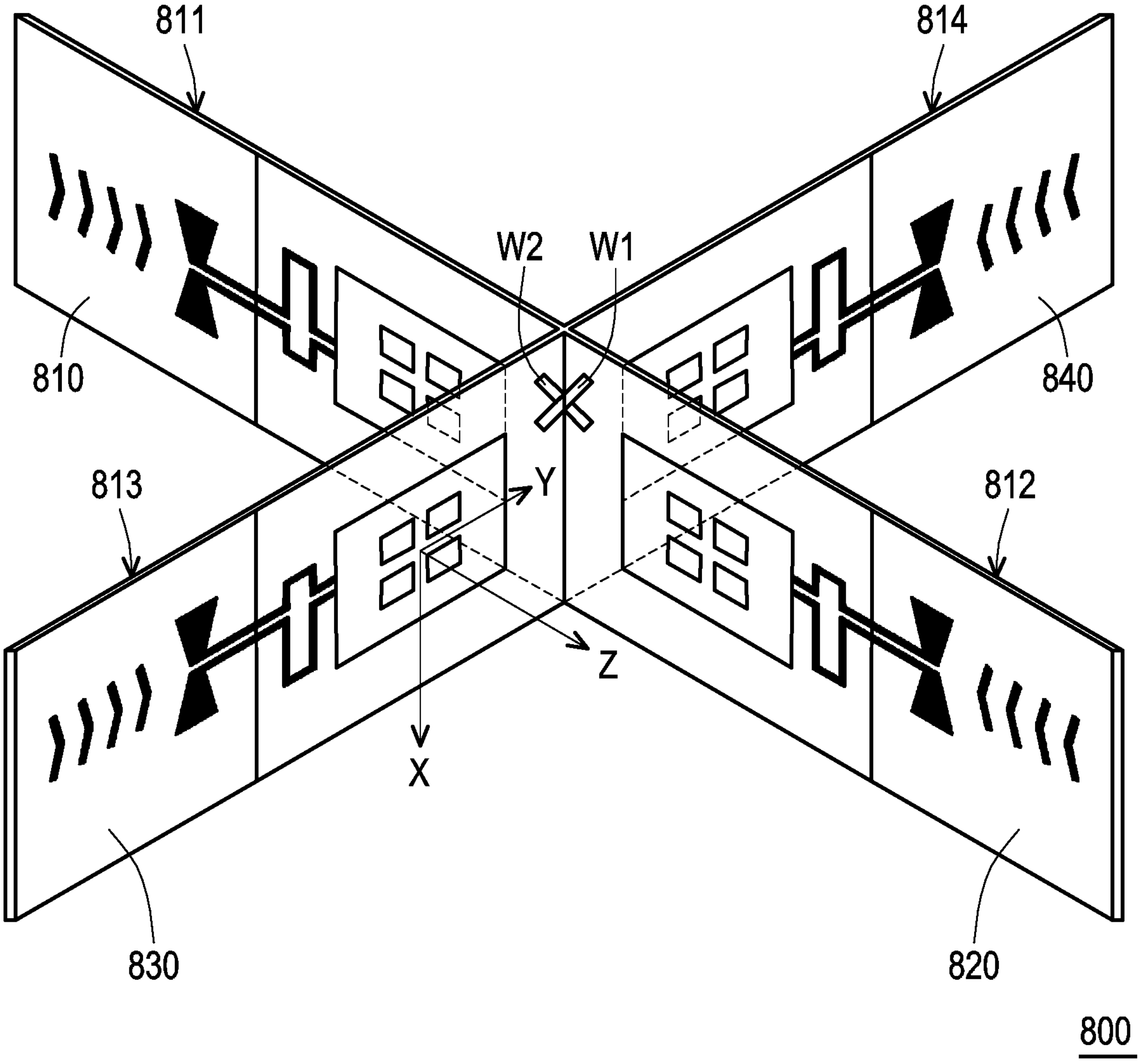
FIG. 8 is a schematic view of an antenna structure according to another embodiment of the disclosure.

Referring to FIG. 8, FIG. 8 is a schematic view of an antenna structure according to another embodiment of the disclosure. An antenna structure 800 includes multiple signal radiation devices 810 to 840. The signal radiation devices 810 to 840 may be respectively disposed on different planar substrates 811 to 814. The planar substrate 811 and the planar substrate 831 are disposed on a first plane formed by the first axis (e.g., the Z axis) and the second axis (e.g., the X axis), and the planar substrate 831 and the planar substrate 841 are disposed on a second plane formed by the second axis (e.g., the X axis) and the third axis (e.g., the Y axis). In addition, the signal radiation devices 810 to 840 may be electrically connected to one another through the transmission wires W1 and W2.

The antenna structure 800 may have a three-dimensional perspective structure, and may thereby expand a pattern range of transceiving signals.

Based on the above, in the signal radiation device and the antenna structure of the disclosure, by disposing the reflective signal radiator between the first signal radiator and the second signal radiator and by combining the design of the circularly polarized waves, the omnidirectional signal transceiving function is achieved. In addition, the antenna device may have multiple-frequency operation, and provide the radio frequency signals to achieve the function of frequency division and multiplexing.

What is claimed is:

1. A signal radiation device, comprising:

- a first signal radiator configured to perform a transceiving operation on a first signal along a first direction, and comprising:
  - a reflection plate;
  - a substrate disposed on the reflection plate, wherein the reflection plate is configured to provide a reference ground plane; and
  - at least one radiation body disposed on the substrate and configured to transceive the first signal;
- a second signal radiator disposed by overlapping with the first signal radiator and configured to perform the transceiving operation on at least one second signal along a second direction and/or a third direction, wherein the first direction, the second direction, and the third direction are different; and
- a reflective signal radiator disposed between the first signal radiator and the second signal radiator, and configured to perform the transceiving operation on a third signal omnidirectionally, wherein the third signal is a signal of a second frequency band, the first signal comprises at least one of a signal of a first frequency band and a signal of a third frequency band, the second signal comprises at least one of the signal of the first frequency band and the signal of the third frequency band, the second frequency band is lower than the first frequency band and the third frequency band, and the reflective signal radiator provides a reflection operation on the third signal.

2. The signal radiation device according to claim 1, wherein a frequency band of the first signal is the same as or different from a frequency band of the second signal.

3. The signal radiation device according to claim 1, wherein the reflective signal radiator comprises:

at least one radiator group, comprising:

a first reflection plate;

a second reflection plate; and a signal feed source coupled between the first reflection plate and the second reflection plate, and configured to transmit a radio frequency signal to the first reflection plate and the second reflection plate, wherein the first reflection plate and the second reflection plate respectively transceive signals of opposite polarities, and the first reflection plate and the second reflection plate provide a reflection operation on the third signal.

4. The signal radiation device according to claim 3, wherein a number of the at least one radiator group is plural, and two of the adjacent radiator groups are spaced apart by a spacing distance.

5. The signal radiation device according to claim 1, wherein a number of the at least one radiation body is plural, and the radiation bodies are disposed on the substrate in an array fashion.

6. The signal radiation device according to claim 1, wherein a shape of the at least one radiation body is circular, triangular, or rectangular.

7. The signal radiation device according to claim 1, wherein the second signal radiator comprises:

a first radiation body disposed on a first side of the signal radiation device and configured to receive the second signal; and at least one first director element adjacent to the first radiation body and disposed along the second direction.

8. The signal radiation device according to claim 7, wherein the second signal radiator further comprises:

a second radiation body disposed on a second side of the signal radiation device and configured to receive the at least one second signal; and at least one second director element adjacent to the second radiation body and disposed along the third direction.

9. The signal radiation device according to claim 7, wherein the at least one first director element has an edge parallel or non-parallel to the first radiation body.

10. The signal radiation device according to claim 7, wherein the first radiation body comprises:

a first sub-radiation body and a second sub-radiation body;

the second signal radiator further comprises:

a signal feed source coupled between the first sub-radiation body and the second sub-radiation body.

11. The signal radiation device according to claim 7, wherein the second signal radiator further comprises:

a reflection plate disposed by overlapping with the first signal radiator;

a substrate disposed between the reflection plate and the first signal radiator, wherein the at least one first director element is disposed above an outer side of at least one side of the reflection plate.

12. The signal radiation device according to claim 11, wherein the at least one side of the reflection plate is a flat side.

13. The signal radiation device according to claim 11, wherein the at least one side of the reflection plate has a concave portion or a protruding portion.

14. An antenna structure, comprising:

a plurality of signal radiation devices according to claim 1, wherein the signal radiation devices are coupled to one another.

15. The antenna structure according to claim 14, wherein the signal radiation devices are collectively disposed on a planar substrate.

16. The antenna structure according to claim 14, further comprising:

a plurality of transmission wires, wherein each of the transmission wires is configured to enable two of the signal radiation devices to be electrically connected to each other.

17. The antenna structure according to claim 14, wherein a first radiation device to a fourth radiation device of the signal radiation devices are respectively disposed on a first planar substrate to a fourth planar substrate, wherein the first planar substrate and the second planar substrate are disposed on a first plane formed by a first axis and a second axis, and the third planar substrate and the fourth planar substrate are disposed on a second plane formed by the second axis and a third axis.

18. The antenna structure according to claim 17, wherein every two of the first axis, the second axis, and the third axis are orthogonal to each other.

19. The antenna structure according to claim 14, wherein every two of the first direction, the second direction, and the third direction are orthogonal to each other.

* * * * *